April 6, 1943.    F. D. FIELDER    2,315,609
GROUND FAULT NEUTRALIZER
Filed Jan. 14, 1942
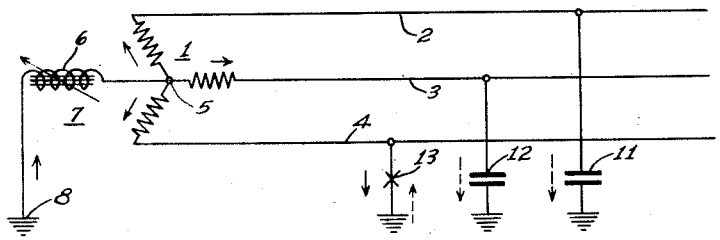
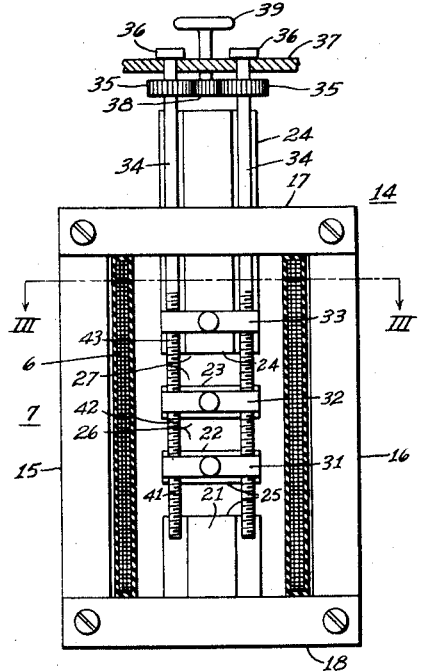
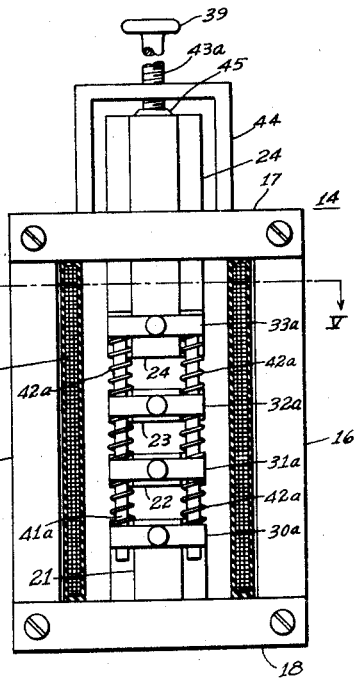
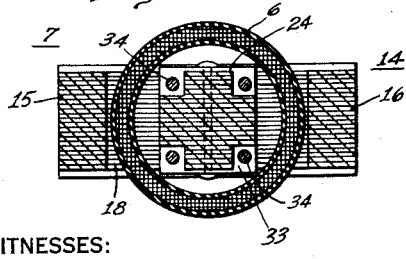
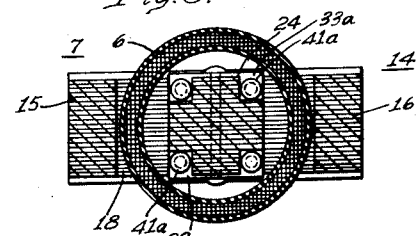
WITNESSES:
INVENTOR
*Frederick D. Fielder.*
BY
*Franklin E. Hardy*
ATTORNEY Patented Apr. 6, 1943

2,315,609

UNITED STATES PATENT OFFICE 2,315,609

GROUND FAULT NEUTRALIZER

Frederick D. Fielder, Sharon, Pa., assignor to Westinghouse Electric & Manufacturing Company, East Pittsburgh, Pa., a corporation of Pennsylvania Application January 14, 1942, Serial No. 426,676

11 Claims. (Cl. 171—97)

My invention relates to improvements in the protection of alternating current electric power systems and particularly to transmission systems employing ground fault neutralizers, such as those tuned to the capacitance to ground of the ungrounded parts of an alternating current circuit commonly called Petersen coils. In such systems a grounding reactor is provided that is connected between a neutral point of the system and ground and is so dimensioned electrically that upon the grounding of one phase conductor of the system, current flows through the grounding reactor which substantially neutralizes the resulting capacity current flowing to ground over the ungrounded phase conductors of the system thus extinguishing the ground fault current.

In order that such reactors may be completely effective to suppress the ground current arc, it is necessary that the neutral-grounding reactors be properly tuned to develop a current that is equal and opposite in phase to that developed by the system capacity to ground, for it has been shown that protective arrangements of this character can perform the desired neutralizing function only within a relatively narrow range of adjustment or tuning within which range there exists a resonant condition.

There is considerable practical difficulty in properly adjusting such neutral grounding devices to the critical value because of the fact that in the past it has been difficult to determine the accuracy of an adjustment without resorting to rather elaborate tests and complicated electrical measurements. Such difficulty is further increased by the condition that the number of circuits in use in the system may vary from time to time, requiring that the value of the reactance in the neutral to ground circuit be changed to compensate for the different values of system capacitance to ground.

The ground fault neutralizer, in accordance with present practice, consists of an iron core reactor, the reactor coil being provided with a large number of tapped connections and with tap changing switches to vary the effective number of turns of the reactor coil so as to provide the desired amount of reactance in the ground to neutral circuit of the system for existing system conditions.

In accordance with my invention, a considerable saving in the size of the ground fault neutralizer may be effected and the amount of materials used may be greatly reduced by controlling the reactance of the ground fault neutralizer by varying the reluctance of the magnetic circuit associated with the reactor winding. This may be done by varying the length of air gaps provided in the magnetic circuit instead of by varying the number of turns of the winding.

It is an object of my invention to provide, in a ground fault neutralizer of the above-indicated character, means for varying the reluctance of the magnetic circuit.

It is a more specific object of the invention to provide a ground fault neutralizer comprising a reactor having a magnetic core structure in which is provided a number of air gaps in series in the magnetic circuit and in which means is provided for varying the length of these several gaps to thereby vary the reluctance of the magnetic circuit and, consequently, the reactance of the device.

Other objects and advantages of the invention will be apparent from the following description of certain preferred embodiments thereof, reference being had to the accompanying drawing, in which:

Figure 1 is a diagrammatic view of circuits and apparatus illustrating the use of a ground fault neutralizer.

Fig. 2 is an elevational view, partly in section, of one preferred embodiment of a grounding reactor constructed in accordance with the invention.

Fig. 3 is a sectional view on line III—III of Fig. 2.

Fig. 4 is an elevational view partly in section, of another preferred embodiment of a grounding reactor in accordance with the invention; and Fig. 5 is a sectional view on line V—V of Fig. 4.

Referring to Figure 1 of the drawing, a transformer is provided having a three-phase high-voltage winding 1 connected to the circuit conductors 2, 3 and 4 of an alternating current transmission system, the neutral point 5 of the Y being connected through the winding 6 of a single phase grounding reactor 7 to ground at 8 in accordance with the present practice of the use of a tuned reactor or Petersen coil as a ground fault neutralizer. The three-phase transformer windings 1 are inductively related to low-voltage windings in a well known manner which low-voltage windings are not here shown as their illustration would not add to the understanding of the invention.

In Fig. 1, the capacitance between conductor 2 and ground is represented diagrammatically by a condenser 11 and the capacitance to ground from the conductor 3 is represented by a condenser 12, a similar capacitance normally existing between conductor 4 and ground. Upon the occurrence of a fault, for example, at 13 between the conductor 4 and ground, zero sequence current will flow from the conductor 4 through the fault, as indicated by the solid-line arrows through the ground at 8 and the reactor coil 6 to the neutral point 5 of the transformer winding, and from the neutral point through the several phase conductors as indicated by the three arrows. Capacity current will also form from conductors 2 and 3 to ground and back to the system through the fault at 13, as indicated by the dotted-line arrows. It is desirable, in order to extinguish the arc, that the value of the zero sequence current flowing through the fault at 13 be equal in value to the capacity current flowing from conductors 2 and 3 to ground and back to conductor 4 through this fault, and that this zero sequence phase current be a lagging current capable of neutralizing the leading or capacity current. In the tuned neutral grounding reactor scheme of the prior art, the reactor is adjusted to a tuned value as above pointed out, by changing tap connections to the reactor winding. In accordance with this invention, the reactor is adjusted by varying the reluctance of the magnetic circuit in a manner that will be clearly understood from the following description of the grounding reactor structure.

Referring to Figs. 2 and 3, a ground fault neutralizer is illustrated comprising a reactor indicated generally at 7 having a winding 6 adapted to be connected in a circuit in accordance with Fig. 1, and associated with the magnetic core structure 14 comprising two outer leg portions 15 and 16 connected at the top and bottom respectively by yoke portions 17 and 18 and having a central or winding leg consisting of a plurality of parts 21, 22, 23 and 24, which are arranged to provide a series of air gaps 25, 26, and 27 therebetween. The lower one 21 of the several winding leg core parts is mounted on the yoke 18 and the remaining core parts 22, 23 and 24 are mounted on supporting brackets 31, 32 and 33. The several brackets 31, 32 and 33 are supported on vertical shafts 34 which are here shown as four in number, and which, as best shown in Fig. 3, are positioned in the spaces provided by forming the core parts as cruciform in section. Operating gears 35 are provided at the upper ends of the shafts 34 which are mounted in bearings 36 in the upper tank wall 37 of the device, a portion only being shown. The gears 35 engage with a gear 38 connected to an operating handle 39, above the tank wall enclosing the core and coil structure, for adjusting the positions of the several winding-leg core parts. Each of the brackets 31, 32, and 33 supporting their associated core parts are threadedly attached to the shafts 34, as shown at 41, 42 and 43, the pitch of the threads associated with these different brackets being so graduated that, as the several core parts move in either direction, the air gaps 25, 26 and 27 vary correspondingly, that is to say, when the shafts 34 are operated to effect movement of the several core parts along the axis of the winding leg, the bracket 32 will move twice as far as the bracket 31 and the bracket 33 will move three times as far as the bracket 31 so that the associated movable core parts move in such manner that the air gaps in series between them are always alike. The upper core part 24 extends upwardly through the yoke 17 a sufficient distance to permit the air gaps between the several core parts to be extended to whatever value is required.

Referring to the embodiment of the invention illustrated in Figs. 4 and 5, it will be observed that the general relation of the core and coil assembly is the same as the embodiment shown in Figs. 2 and 3. In this embodiment of the invention, however, guide rods 41a are provided extending through openings in the several brackets 30a, 31a, 32a and 33a associated, respectively, with the core parts 21, 22, 23 and 24 of the winding leg. Coil spring members 42a are provided about the guide rods 41a between the adjacent brackets 30 to 33 to force each of the several core parts away from its adjacent core part in the series circuit of the flux path. The adjustment of the several core parts is made by adjusting the position of the upper core part 24 by the operation of a handle 39 which may extend above the cover of the apparatus casing, as shown in Fig. 2, and which is connected to a screw threaded shaft 43a which is operatively threaded to a bracket 44. The shaft is provided at its lower end with an abutment 45 for forcing the core part 24 downwardly against the bias of the several coil springs 42a to adjust the several separable core parts in accordance with the increasing or decreasing tension impressed thereon. The several coil springs 42a may be readily arranged in such manner that, as the tension applied to them is varied, the movement of the several core parts will be such as to maintain a substantially constant air gap between adjacent parts.

In a grounding reactor built in accordance with the present invention, the necessity for providing a large number of winding taps, together with tap switches for varying the tapped connections to the winding, is eliminated and a grounding reactor is provided having an infinite number of reactor values depending upon the position of the winding leg core parts which may be adjusted for large changes or small changes in reactance values, as desired.

It will be apparent to those skilled in the art that modifications in the apparatus illustrated and described may be made within the spirit of my invention, and I do not wish to be limited otherwise than by the scope of the appended claims.

I claim as my invention:

1. In combination, an alternating-current electrical transmission system having a ground fault neutralizer comprising a grounding reactor having an iron core structure and a winding inductively related thereto and connected between a neutral point of the system and ground, and means for so adjusting the reactance of said ground fault neutralizer as upon the grounding of one phase conductor of the system to substantially neutralize the capacity current to ground of the ungrounded part of the system, said adjusting means comprising means for adjusting the reluctance of the magnetic circuit of the iron core.

2. In combination, an alternating-current electrical transmission system having a ground fault neutralizer comprising a grounding reactor having an iron core structure and a winding inductively related thereto and connected between a neutral point of the system and ground, and means for so adjusting the reactance of said ground fault neutralizer as upon the grounding of one phase conductor of the system to substantially neutralize the capacity current to ground of the ungrounded part of the system, said core comprising a magnetic structure including a winding leg having a plurality of separable core parts arranged to provide a plurality of air gaps in series in the magnetic circuit, and means for adjusting the total length of gap in the magnetic circuit.

3. In combination, an alternating-current electrical transmission system having a ground fault neutralizer comprising a grounding reactor having an iron core structure and a winding inductively related thereto and connected between a neutral point of the system and ground, and means for so adjusting the reactance of said ground fault neutralizer as upon the grounding of one phase conductor of the system to substantially neutralize the capacity current to ground of the ungrounded part of the system, said core comprising a magnetic structure including a winding leg having a plurality of separable core parts arranged to provide a plurality of air gaps in series in the magnetic circuit, and means for causing a relative movement of said separable core parts to effect like variations in the lengths of the several air gaps.

4. In combination, an alternating-current electrical transmission system having a ground fault neutralizer comprising a grounding reactor having an iron core and a winding inductively related thereto and connected between a neutral point of the system and ground, and means for so adjusting the reactance of said ground fault neutralizer as upon the grounding of one phase conductor of the system to substantially neutralize the capacity current to ground of the ungrounded part of the system, said core comprising a magnetic structure including a winding leg having a plurality of separable core parts, supporting means for the core parts comprising a plurality of shafts arranged parallel to the axis of the winding leg and provided with screw threads, individual supports for the separated movable core parts having screw threads for cooperating with the threads on said shafts, the threads associated with supporting one core apart having a pitch different from those supporting another core part so that the several parts move different distances for a given movement of the shafts to simultaneously vary the several air gaps.

5. In combination, an alternating-current electrical transmission system having a ground fault neutralizer comprising a grounding reactor having an iron core and a winding inductively related thereto and connected between a neutral point of the system and ground, and means for so adjusting the reactance of said ground fault neutralizer as upon the grounding of one phase conductor of the system to substantially neutralize the capacity current to ground of the ungrounded part of the system, said core comprising a magnetic structure including a winding leg having a plurality of separable core parts, supporting means for the core parts comprising a plurality of shafts arranged parallel to the axis of the winding leg for guiding the core parts along the axis of the winding leg, biasing means for biasing the several core parts from adjacent core parts, and means for varying the pressure on said several biasing means for correspondingly adjusting the lengths of the several air gaps in series.

6. In combination, an alternating-current electrical transmission system having a ground fault neutralizer comprising a grounding reactor having an iron core structure and a winding inductively related thereto and connected between a neutral point of the system and ground, and means for so adjusting the reactance of said ground fault neutralizer as upon the grounding of one phase conductor of the system to substantially neutralize the capacity current to ground of the ungrounded part of the system, said adjusting means including a plurality of spaced core parts providing air gaps therebetween and means for varying the positions of said core parts for adjusting the reluctance of the magnetic circuit of the iron core.

7. In combination, an alternating-current electrical transmission system having a ground fault neutralizer comprising a grounding reactor having an iron core structure and a winding inductively related thereto and connected between a neutral point of the system and ground, and means for so adjusting the reactance of said ground fault neutralizer as upon the grounding of one phase conductor of the system to substantially neutralize the capacity current to ground of the ungrounded part of the system, said core comprising a magnetic structure including two outer core legs and a middle winding leg having a plurality of separable core parts arranged to provide a plurality of air gaps in series in the winding leg, and means for adjusting the relative spacing of said several core parts for varying the total length of gap in the magnetic circuit.

8. In combination, an alternating-current electrical transmission system having a ground fault neutralizer comprising a grounding reactor having an iron core structure and a winding inductively related thereto and connected between a neutral point of the system and ground, and means for so adjusting the reactance of said ground fault neutralizer as upon the grounding of one phase conductor of the system to substantially neutralize the capacity current to ground of the ungrounded part of the system, said core comprising a magnetic structure having a plurality of separable core parts arranged to provide a plurality of air gaps in series in the magnetic circuit, and means for causing a relative movement of said separable core parts to adjust the lengths of the several air gaps.

9. In a grounding reactor for connection between the neutral point of an alternating-current electrical transmission system and ground for providing a reactance of a value that, upon the grounding of one phase conductor of the system will substantially neutralize the capacity current to ground of the ungrounded part of the system, said reactor comprising an iron core and a winding inductively related thereto, said core comprising a magnetic structure including a winding leg having a plurality of separable core parts, supporting means for the core parts comprising a plurality of shafts arranged parallel to the axis of the winding leg and provided with screw threads, individual supports for the separated movable core parts having screw threads for cooperating with the threads on said shafts, the threads supporting one core part having a pitch different from those supporting another core part so that the several parts move different distances for a given movement of the shafts to simultaneously vary the several air gaps.

10. In a grounding reactor for connection between the neutral point of an alternating-current electrical transmission system and ground for providing a reactance of a value that, upon the grounding of one phase conductor of the system will substantially neutralize the capacity current to ground of the ungrounded part of the system, said reactor comprising an iron core and a winding inductively related thereto, said core comprising a magnetic structure including a winding leg having a plurality of separable core parts, supporting means for the core parts comprising a plurality of shafts arranged parallel to the axis of the winding leg for guiding the core parts along the axis of the winding leg, biasing means for biasing the several core parts from adjacent core parts, and means for varying the portion on said several biasing means for correspondingly adjusting the lengths of the several air gaps in series.

11. In a grounding reactor for connection between the neutral point of an alternating-current electrical transmission system and ground for providing a reactance of a value that, upon the grounding of one phase conductor of the system will substantially neutralize the capacity current to ground of the ungrounded part of the system, said reactor comprising an iron core and a winding inductively related thereto, said core comprising a magnetic structure including two outer core legs and a middle winding leg having a plurality of separable core parts arranged to provide a plurality of air gaps in series in the winding leg, and means for adjusting the relative spacing of said several core parts for varying the total length of gap in the magnetic circuit.

FREDERICK D. FIELDER.